United States Patent Office 3,247,634
Patented Apr. 26, 1966

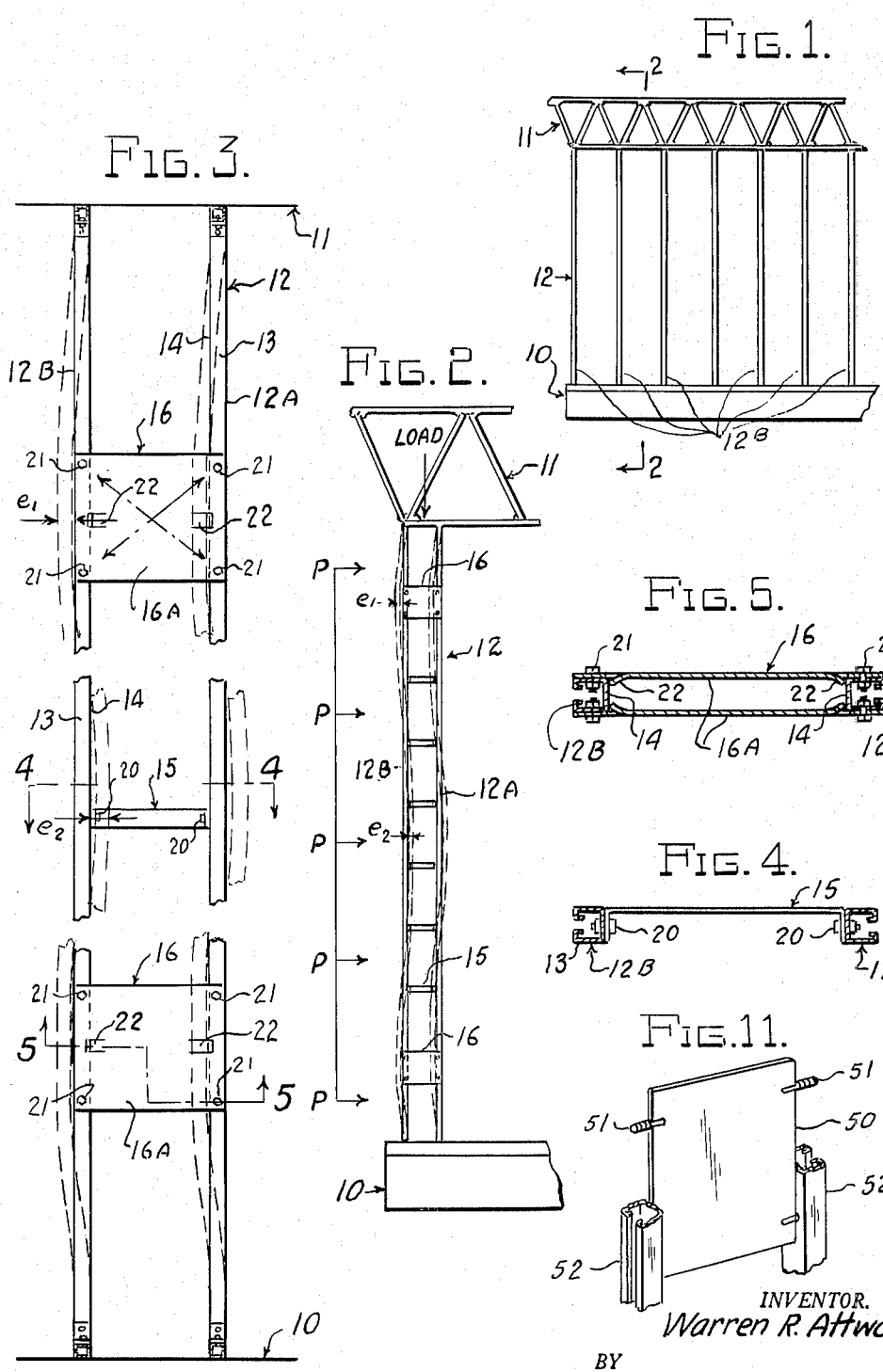

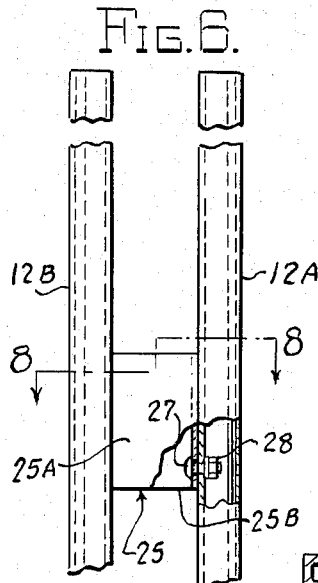
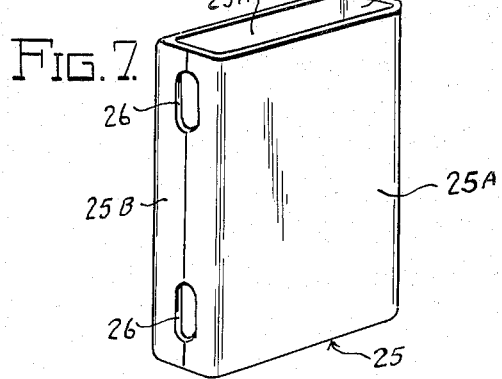
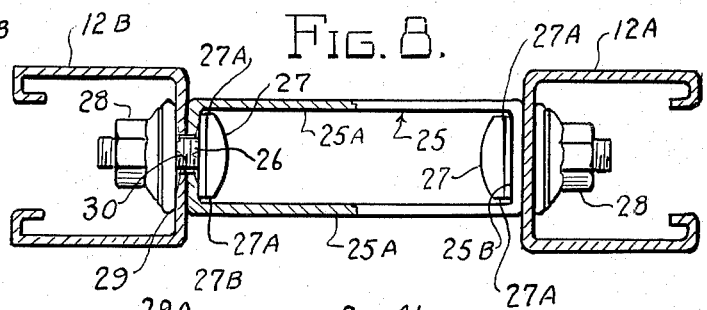
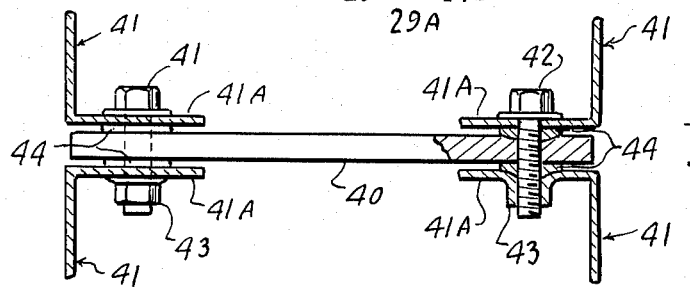
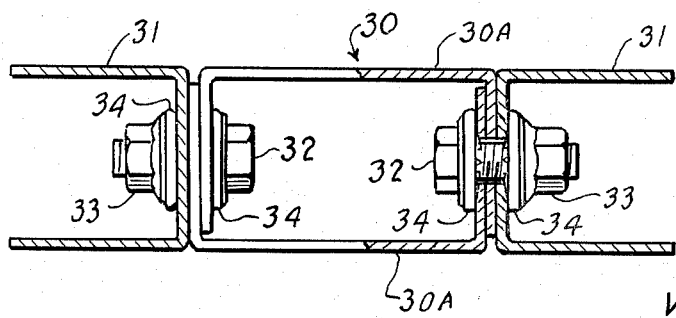
INVENTOR.
Warren R. Attwood

3,247,634
STRUCTURAL ASSEMBLY
Warren R. Attwood, 4118 S. Wayne Road,
Wayne, Mich.
Filed Nov. 21, 1960, Ser. No. 70,559
4 Claims. (Cl. 52—222)

My invention relates to structural assemblies and more particularly to light weight truss assemblies for building walls and the like.

In the development of structural systems such as that described in my patent application Serial No. 58,874 filed September 20, 1960 relating to an improved space frame structural system, a new general concept in lightweight building construction is outlined in which primary objects are to reduce weight and cost and to provide for fully salvageable and standardized factory produced structural components which are readily assembled in the field by relatively inexperienced workmen using only a few simple tools.

These goals must be achieved, however, with no sacrifice in structural stability and quality, otherwise the system is self-defeating from economic and practical standpoints. The structural assemblies must be capable of supporting all the usually encountered loads and must withstand the same stresses of vibration, shock, wind loads and the like for which, conventionally, much heavier structures have heretofore been designed.

A serious problem encountered in developing the present system was that walls with light-weight framing would seem to be incapable of withstanding the deflections encountered under higher than usual lateral loads such as are produced by predominently high velocity winds found in certain areas of the world. Conventional light weight framing tends to bow inward under such conditions, and then the effect of the load supported by the frame is enhanced, increasing the risk of eventual collapse and loss of life and property.

An object of the present invention is to further the aforesaid goals and solve attendant problems by producing a light weight truss assembly for walls and the like capable of carrying loads and stresses for which much heavier structures have heretofore been designed.

Another object of the invention is to improve structural framing by providing a truss assembly in walls and the like which has self-compensating deflection characteristics.

A further object of the invention is to facilitate the construction of buildings and the like by providing a simplified wall stud assembly having relatively few factory produced parts which are readily bolted together in the field.

For a more complete understanding of the invention, reference may be had to the accompanying drawings illustrating various embodiments of the invention in which like reference numerals refer to like parts throughout the several views and in which FIG. 1 is a diagrammatic elevational view of a wall framing system.

FIG. 2 is a cross-sectional view taken substantially on the line 2—2 of FIG. 1 illustrating one form of the invention.

FIG. 3 is an enlargement of the vertical truss assembly of FIG. 2.

FIG. 4 is a cross-sectional view taken substantially on the line 4—4 of FIG. 3.

FIG. 5 is a cross-sectional view taken substantially on the line 5—5 of FIG. 3.

FIG. 6 is a fragmentary view of another vertical truss assembly embodying another form taken by the invention.

FIG. 7 is a perspective view of one part used in the assembly of FIG. 6.

FIG. 8 is a cross-sectional view taken substantially on the line 8—8 of FIG. 6.

FIG. 9 is a cross-sectional view of still another truss assembly embodying another form of the invention.

FIG. 10 is a cross sectional view of yet another truss assembly incorporating a further embodiment of the invention.

FIG. 11 is a perspective view of a further embodiment of the invention.

As shown in FIG. 1, a preferred building may include a supporting base structure 10 and a roof structure 11 carried by columns.

FIGS. 2–5 illustrate details of construction of one column 12 as comprising a pair of spaced parallel stud members 12A and 12B, designated respectively as the inner and the outer stud, fixed at their ends by any preferred means to suitable parts of the base and roof structures 10 and 11.

Inner and outer wall panels (not shown) of any preferred type will be secured respectively to the inner and outer stud members 12A and 12B. In the embodiment shown, these stud members preferably comprise channels having sides 13 and backs 14, the openings of the channels as shown in FIGS. 4 and 5 preferably facing oppositely away from each other. The panels (not shown) are readily connected to the open sides by suitable fittings (not shown).

Under lateral pressures such as are produced by high wind loading and the like, such walls will normally have a tendency to bow inwardly from top to bottom, and under such conditions would ordinarily be found generally unacceptable for carrying usual roof loads or for withstanding other vibrations, shocks or stress producing conditions of varying kinds.

I have discovered, however, that unusual results are obtained by making use of suitably positioned and properly secured spacers 15 and stress transmitting connectors 16. The spacers 15 do not carry loads but merely act to maintain the studs substantially parallel during deflection. Thus they may be light weight, relatively few in number and disposed normal to the axes of the studs, which makes for simplicity of assembly.

The connectors 16 must be of substantial strength and quite rigidly secured to at least four spaced points on the studs, two points on the inner stud 12A and two on the outer stud 12B. The connectors 16 are spaced at a fixed distance from the ends of the studs, the distance depending on the loadings and forces to be encountered, the relative rigidity desired of the assembly as a whole, the length and separation of the studs, and the physical characteristics of the material used.

The use of such connectors 16 imparts radically unique deflection characteristics to the assembly under lateral loads such as high wind pressure indicated by the symbols P in FIG. 2. Instead of bowing inwardly between the ends as would ordinarily be expected, the connectors 16 transmit stresses, as indicated by the arrows in FIG. 3, angularly between the studs in the areas where local deflection is practically eliminated by the presence of the connectors 16. The lateral forces become redistributed to actually redeflect the ends of the assembly outwardly. These deflections are indicated in exaggerated form by the dotted curved lines in FIGS. 2 and 3.

Maximum inward deflection intermediate the connectors 15 is indicated as $e_2$ in FIGS. 2 and 3, while the maximum outward deflections are indicated at $e_1$. It will be seen that the inward deflection $e_2$ not only is decreased from what it would be without the connectors 16, but it is compensated by the outward deflections. The dimensional difference between $e_1$ and $e_2$ is smaller than a rigid frame under optimum conditions. Thus, with the eccentricity of the column at a minimum, the member can support more column load with a given amount of wind load than if $e_2$ were not present. The total deflection of the column is materially reduced.

Other advantages of such an assembly are also readily apparent. For example, time of construction is greatly reduced. The space between the inner and outer wall panels may be more readily used for placement of pipes, wiring and the like since the truss work is open and uncluttered. Also, components are readily standardized for factory manufacturing and delivery as a complete integrated package usable and reusable in a variety of ways for different types of buildings. Concrete, plaster, nails and all sorts of permanent and unsalvageable materials are eliminated.

The connector 16 may be constructed and secured to the studs 12 in a variety of ways, and the studs 12 may be of various cross-sections, all dependent on the results desired.

In FIGS. 2-5, the studs 12A and 12B are channels, as previously stated, and the connector 16 comprises a pair of separate parallel spaced plates 12A, each plate being rigidly secured to two spaced points on the sides of both studs by bolts 21 or other preferred fasteners. If desired, positioning of the plates 16A may be accomplished by punched in abutments 22 which will bear on the backs 14 of the channels. This structure has been found desirable for widely spaced studs 12A and 12B.

In FIGS. 6-8, a different type of connector 25 is used between more closely spaced studs 12A and 12B and where the sides of the studs 12A and 12B must be free. In this case, the connector 25 is in the form of an open-ended box, with side wall plates 25A extending between the studs 12A and 12B and acting as stress-transmitting members as previously described. The other parallel side walls 25B are provided with an elongated slot 26, permitting of rigid connection to the backs of the channel studs 12A and 12B by means of bolts 27 and nuts 28. The bolts 27 are round, square or hex head bolts with opposite sides of the heads flattened as at 27A so that they will fit between the side wall plates 25A as shown and thereby be prevented from turning when torque is applied to the nuts 28. The bolt heads 27 are also preferably provided with sharp radial spaced teeth 27B which cut into the edges of the slots 26 as indicated in FIG. 8. Under the nuts 28, special washers 29 may be provided, these washers also having radial teeth 29A which cut into the edges of perforations 30 provided in the backs of the channel studs 12A and 12B.

These bolts 27 and washers 29 are specially made to transmit stresses and prevent slippage, and are more fully described in my abandoned patent application Serial No. 669,027, filed July 1, 1957.

The box-like connector 25 is particularly useful in eliminating unsightly protruding fasteners as where studs form door and window frame members and when properly engineered are capable, with a total of only four bolt fastenings, of transmitting high stresses.

Another form of box-like connector 30 is illustrated in FIG. 10, in which it comprises a pair of channel members 30A face to face with their sides clamped together and to channel studs 31 by bolts 32 and nuts 33. In this case, toothed washers 34 like washers 29 in FIG. 8 are shown as disposed under the heads of the bolts 32 as well as the nuts 33.

In FIG. 9, a single connector plate 40 is illustrated as being clamped between the parallel shaped legs 41A of angle studs 41 by bolts 42 and nuts 43, toothed washers 44 being clamped intermediate the plate 40 and legs 41A.

FIG. 11 illustrates a single connector plate 50 having four threaded studs 51 welded or otherwise mounted rigidly to opposite edges of the plate 50. These threaded studs may be readily secured to channels 52 or other types of column members.

Although I have described only a few embodiments of my invention, it will be apparent to one skilled in the art to which the invention pertains that various changes and modifications may be made therein without departing from the spirit of the invention as expressed by the scope of the appended claims.

I claim:

1. A structural truss for building walls and the like comprising
   (a) lower and upper spaced supporting structures,
   (b) an inner stud member and an outer stud member spaced from and parallel with said inner stud member,
   (c) said stud members being secured in fixed positions at their ends to said supporting structures and being laterally deflectable under lateral loads or pressures,
   (d) a pair of spaced stress-transmitting connector assemblies disposed one each at a fixed distance from the ends of said stud members,
   (e) means securing each of said connector assemblies rigidly to each of said stud members at at least two longitudinally spaced points in a manner to minimize deflection between said points by transferring stress angularly across said connector assemblies,
   (f) the spacing between said connector assemblies being greater than the spacing between said connector assemblies and the ends of said stud members,
   (g) each of said connector assemblies comprising a pair of spaced parallel plates and said plates having joining end walls forming an open-ended box, and
   (h) said securing means being connected to said end walls.

2. The truss as defined in claim 1 and in which said plates and end walls are integral and formed from one sheet of material.

3. A structural truss for building walls and the like comprising
   (a) lower and upper spaced supporting structures,
   (b) an inner stud member and an outer stud member spaced from an parallel with said inner stud member,
   (c) said stud members being secured in fixed positions at their ends to said supporting structures and being laterally deflectable under lateral loads or pressures,
   (d) a pair of spaced stress-transmitting connector assemblies disposed one each at a fixed distance from the ends of said stud members,
   (e) means securing each of said connector assemblies rigidly to each of said stud members at at least two longitudinally spaced points in a manner to minimize deflection between said points by transferring stress angularly across said connector assemblies,
   (f) the spacing between said connector assemblies being greater than the spacing between said connector assemblies and the ends of said stud members,
   (g) said stud members each comprising a C-shaped channel with the open side of each of said channels facing oppositely away from the open side of the other of said channels, and
   (h) each of said connector means comprising an open-ended rectilinear box with two opposite sides parallel to the sides of said channels and the two other opposite sides of said box secured to the backs of said channels.

4. The truss as defined in claim 3 and in which said box comprises a pair of plates each channel-shaped with the legs of the channels of one plate overlapping the legs of the channels of the other plate.

(References on following page)

References Cited by the Examiner

UNITED STATES PATENTS

| | | | |
|---|---|---|---|
| 577,820 | 2/1897 | Kindl | 52—696 |
| 1,675,825 | 7/1928 | Schlafly | 52—694 |

FOREIGN PATENTS

| | | |
|---|---|---|
| 540,409 | 5/1957 | Canada. |
| 1,172,731 | 10/1958 | France. |

RICHARD W. COOKE, Jr., *Primary Examiner.*
JOEL REZNEK, *Examiner.*